May 6, 1952   R. F. KAEINTZ   2,595,526
AUTOMOBILE FOOTREST
Filed June 8, 1950
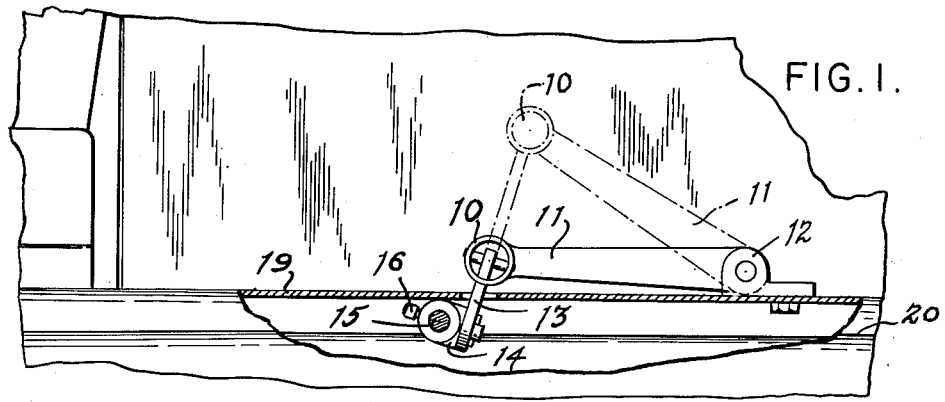
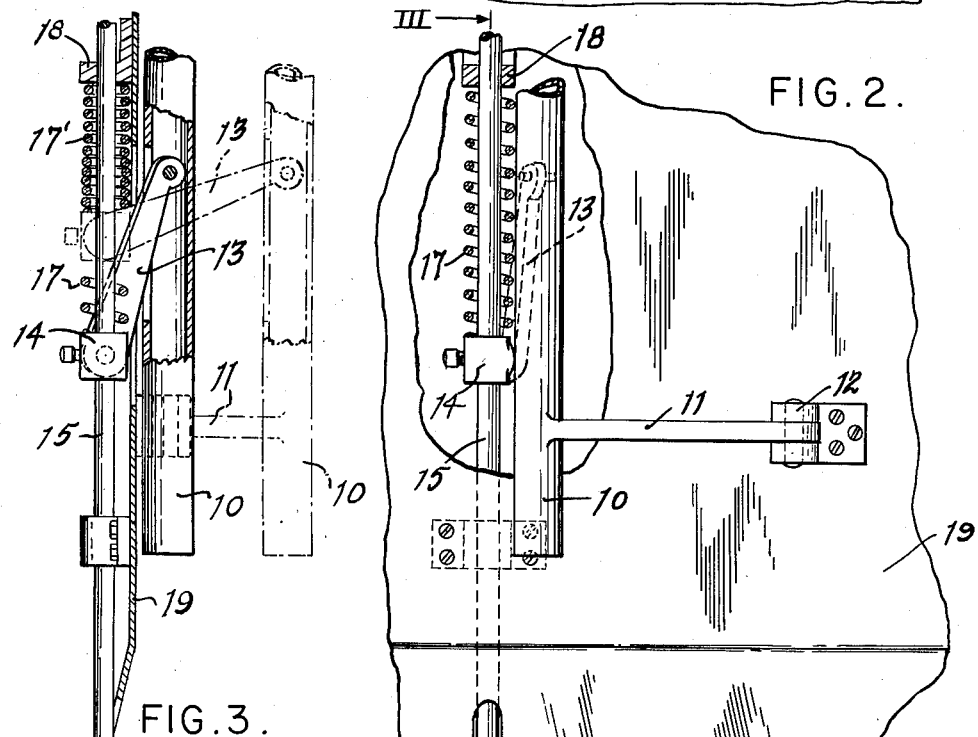
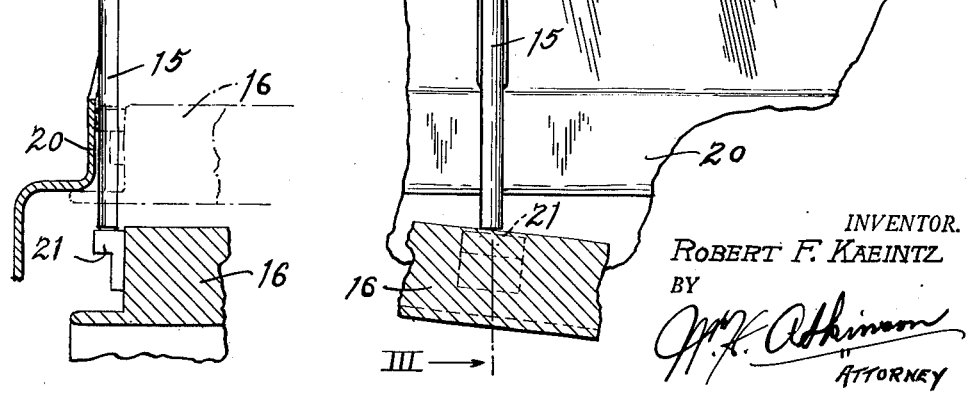
INVENTOR.
ROBERT F. KAEINTZ
BY
*Atkinson*
ATTORNEY Patented May 6, 1952

2,595,526

UNITED STATES PATENT OFFICE 2,595,526

AUTOMOBILE FOOTREST

Robert F. Kaeintz, San Francisco, Calif., assignor of forty-five per cent to Le Roy D. Holdren, San Francisco, Calif.

Application June 8, 1950, Serial No. 166,880

2 Claims. (Cl. 296—75)

My present invention relates to automobile bodies and more particularly to an improved foot-rest for the passenger compartment of taxicabs and the like.

An object of the invention is to provide a foot-rest which will automatically recede into an inoperative position and out of interfering relation with ingress or egress of a passenger when the door of the automobile is opened.

Another object of the invention is to provide a new and novel arrangement by which a foot-rest pivotally mounted upon the floor of an automobile body may be raised and lowered in response to the final closing and initial opening movements of the door of an automobile.

In taxicabs of the seven-passenger type, such as employ jump seats, there is such an excess of leg room for the parties riding in the back seat of the cab that upon a sudden stopping such as frequently occurs in heavy traffic, the passengers find it difficult to hold their seats and often wind up on the floor of the cab. This constitutes a source of annoyance to operators due to claims for injuries arising from this cause. Likewise, where a permanent foot-rest is provided, this also constitutes a hazard as the passengers often trip over same when boarding and alighting from the cab. It is therefore a more particular object of the invention to provide a foot-rest for automobiles that will be free of the above objectionable features.

Other objects and advantages of the invention will be in part evident to those skilled in the art and in part pointed out hereinafter in connection with the accompanying drawing wherein there is shown by way of illustration and not of limitation a preferred embodiment thereof.

In the drawing:

Figure 1 is a fragmentary side view of the invention with parts broken away and in section showing my improved foot-rest in its operative position.

Figure 2 is a fragmentary plan view showing the device as illustrated in Figure 1 of the drawing.

Figure 3 is a fragmentary sectional view taken along line III—III of Figure 2, looking into direction of arrows.

To overcome each of the aforementioned objections I have by my invention provided a foot-rest that may be mounted at the most convenient point of the cab for use by the back seat riders and which will become operative as a foot-rest only when the cab door is closed and also recede into an inoperative and non-interfering position when the cab door is opened. For better understanding of the invention reference is now made to the accompanying drawing.

As shown in the drawing, the foot-rest proper is in the form of a transversely extending tubular bar 10 which may extend entirely across the rear compartment of the automobile body or, it may be in two similar parts arranged in alignment. The tubular bar 10 has two spaced forwardly extending arms 11 that are arranged to be pivotally secured to a hinge block 12. The arms 11 are of a length which will swing in an arc that will dispose the foot-rest approximately four inches above the floor of the automobile body, as indicated by the dot and dash lines, when the foot-rest is in operation. Pivotally connected to the tubular bar 10 and intermediate the forwardly extending arms 11 there is a diagonally disposed link 13 which is pivotally connected at its lower end to link-carrying block 14 that is secured upon a transversely removeable push-rod 15. The link-carrying block 14 is here shown as fixed upon the push-rod 15 by means of a set screw 16 and when properly adjusted its position upon the push-rod 15 will determine the amount of elevation of the foot-rest when the push-rod 15 is operated by the automobile door, as will hereinafter appear.

As is more clearly shown in Figures 2 and 3 of the drawing, the push-rod 15 is extended outwardly through the automobile body structure to a point where it will be exposed for engaging with a door 16 of the automobile. The outward extension of the push-rod will be determined by the position at which the link-carrying member 14 is secured thereupon and the elevation of the foot-rest will be determined by the length of the link 13. In these latter figures of the drawing it will be noted that the push-rod 15 is biased outwardly toward the door 16 by means of a compression spring 17 that is interposed between a fixed bearing 18 through which the push-rod 15 slides and the link-carrying member 14. As is more clearly shown in Figure 3 of the drawings the floor 19 of the car body is of sheet metal and in bodies of the taxicab type of the floor 19 is inclined slightly outward so as to provide a sill 20 between the door 16 and over which the push-rod 15 may be conveniently located without presenting any obstruction or interference with ingress and egress of a passenger. In this particular arrangement the door 16 has a pillow block 21 that extends downwardly and is positioned to engage with the extending end of the push-rod 15. When the door 16 of the cab is open the tubular bar 10 will assume a position substantially flat upon the floor of the automobile body and the spring 17 will be fully extended and when the cab door 16 is fully closed the spring 17 will be fully compressed as at 17'. At the same time the link 13 will assume a more vertical position which will cause the tubular bar 10 to become elevated as indicated by dot and dash lines.

In this particular arrangement it will be understood that the foot-rest will be operative from only one side of the automobile body and by preference the door which opens upon the curb will be relied upon to operate the foot-rest. However, if under other circumstances it is desired to provide a foot-rest that will be responsive to the door at each side of the automobile body the foot-rest may be divided into two equal halves with the parts arranged in right and left-hand relation. In this manner the half portion of the foot-rest adjacent to the open door will recede while the foot-rest at the other side of the automobile body will remain elevated. This will not be objectionable because it is only when the particular door is open that a receding of the foot-rest will be desired. As a consequence, any passenger remaining in the rear seat of the automobile may retain his seat without removing his feet from the foot-rest.

While I have, for the sake of clearness and in order to disclose the invention so that the same can be readily understood, described and illustrated a specific form and arrangement, it is to be understood that the invention is not limited to the specific forms disclosed, but may be embodied in other forms that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is—

1. An automatic receding foot-rest for automobile bodies, comprising a transversely extending bar-like foot-rest having arms extending at right angles at the ends thereof adapted and arranged to be pivotally secured to the floor of an automobile body, a push-rod slideably mounted below the floor of said automobile body and adapted to move transversely of said body when engaged at its end by a door of said body, a spring means for moving said push rod outwardly when said door is opened, a link-carrying member secured in a fixed position upon said push-rod, and a link extending from said link-carrying member pivotally connected to said transversely extending foot-rest member, said link-carrying member being so positioned upon said push-rod with respect to its door-engaging end that said link will operate to raise said foot-rest member into an operative position when the door is closed and permit said foot-rest to assume a lowered position upon the floor of said body when said door is opened.

2. The invention as set forth in claim 1, characterized by the fact that the bar-like foot-rest is formed in two parts with the described operating mechanism duplicated for each part of the foot-rest and arranged in co-operating relation with a door at the corresponding opposite side of the automobile body.

ROBERT F. KAEINTZ.

REFERENCES CITED

The following references are of record in the file of this patent:

UNITED STATES PATENTS

| Number | Name | Date |
|---|---|---|
| 879,646 | Jones | Feb. 18, 1908 |
| 2,202,857 | Jacobs | June 4, 1940 |